US012623487B2

(12) United States Patent
Suzuki et al.

(10) Patent No.: US 12,623,487 B2
(45) Date of Patent: May 12, 2026

(54) MOBILE BODY

(71) Applicants: Sony Group Corporation, Tokyo (JP); Sony Interactive Entertainment Inc., Tokyo (JP)

(72) Inventors: Ryuichi Suzuki, Tokyo (JP); Fumihiko Iida, Kanagawa (JP); Koichi Obana, Tokyo (JP)

(73) Assignees: Sony Group Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/697,776

(22) PCT Filed: Aug. 8, 2022

(86) PCT No.: PCT/JP2022/030231
§ 371 (c)(1),
(2) Date: Apr. 2, 2024

(87) PCT Pub. No.: WO2023/067875
PCT Pub. Date: Apr. 27, 2023

(65) Prior Publication Data
US 2025/0236135 A1 Jul. 24, 2025

(30) Foreign Application Priority Data

Oct. 19, 2021 (JP) .................................. 2021-171192

(51) Int. Cl.
*B60B 19/00* (2006.01)
*B60B 19/12* (2006.01)
*B62D 61/06* (2006.01)

(52) U.S. Cl.
CPC ............ *B60B 19/003* (2013.01); *B60B 19/12* (2013.01); *B62D 61/06* (2013.01); *B60B 2900/114* (2013.01)

(58) Field of Classification Search
CPC . B60B 19/003; B60B 19/12; B60B 2900/114; B62D 61/06
See application file for complete search history.

(56) References Cited

U.S. PATENT DOCUMENTS

| | | | | |
|---|---|---|---|---|
| 9,573,416 B1 * | 2/2017 | Niemeyer | ............. | B60B 19/003 |
| 12,157,535 B2 * | 12/2024 | Yada | ...................... | B62M 13/04 |

(Continued)

FOREIGN PATENT DOCUMENTS

| | | |
|---|---|---|
| CN | 110329146 A | 10/2019 |
| CN | 111377006 A | 7/2020 |

(Continued)

OTHER PUBLICATIONS

International Search Report and Written Opinion mailed on Sep. 13, 2022, received for PCT Application PCT/JP2022/030231, filed on Aug. 8, 2022, 8 pages including English Translation.

(Continued)

*Primary Examiner* — Jason D Shanske
*Assistant Examiner* — Matthew James O'Neill
(74) *Attorney, Agent, or Firm* — Fish & Richardson P.C.

(57) ABSTRACT

A mobile body includes a base, three wheels attached to the base, and actuators each of which drives each wheel, and enables omnidirectional movement. Of the three wheels, one or two of the wheels are first configuration wheels, and the remaining wheel or wheels are second configuration wheels. The one wheel is oriented parallel or orthogonal to the orientation of the other two wheels.

8 Claims, 9 Drawing Sheets

(56)                    References Cited

U.S. PATENT DOCUMENTS

| | | | | |
|---|---|---|---|---|
| 2005/0153629 A1* | 7/2005 | Byun | .................... | B60B 19/003 |
| | | | | 446/465 |
| 2015/0227127 A1 | 8/2015 | Miller et al. | | |
| 2018/0014988 A1 | 1/2018 | Diaz-Flores et al. | | |
| 2020/0290603 A1* | 9/2020 | Sadamoto | ........... | B60W 30/143 |

FOREIGN PATENT DOCUMENTS

| | | | |
|---|---|---|---|
| JP | 2008-179187 A | 8/2008 |
| JP | 2017-001450 A | 1/2017 |
| JP | 2017-052417 A | 3/2017 |
| JP | 2018-131165 A | 8/2018 |
| JP | 2019-053391 A | 4/2019 |
| JP | 2020-045089 A | 3/2020 |
| JP | 2020-149508 A | 9/2020 |

OTHER PUBLICATIONS

Miyakoshi, "Omni-directional parallel two wheel type inverted pendulum mobile platform using mecanum wheels and omni-wheels," Proceedings of the 2015 JSME Conference on Robotics and Mechatronics, Jun. 2016, 2A1-07a4(1)-2A1-07a4(4) (with English Abstract).

vstone.co.jp [online], "Smooth Omni Wheel," available on or before Sep. 3, 2021, retrieved on Aug. 18, 2025, retrieved from URL<https://www.vstone.co.jp/robotshop/index.php?main_page=product_info&products_id=4394>, 18 pages (with machine translation).

\* cited by examiner

F I G. 1 (b)

F I G. 1 (a)

F I G. 2 (a)
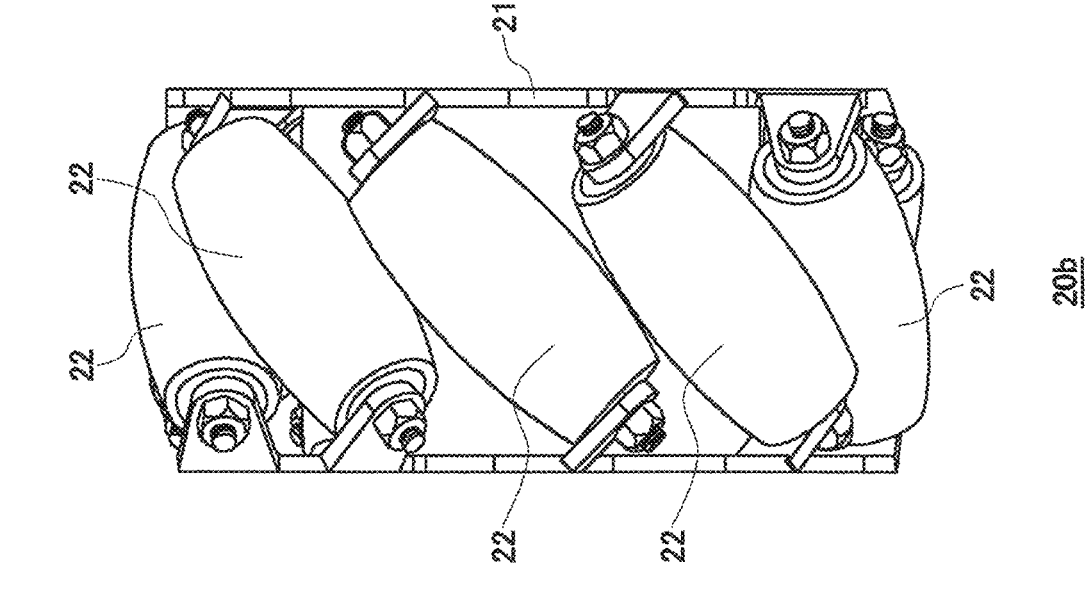
F I G. 2 (b)
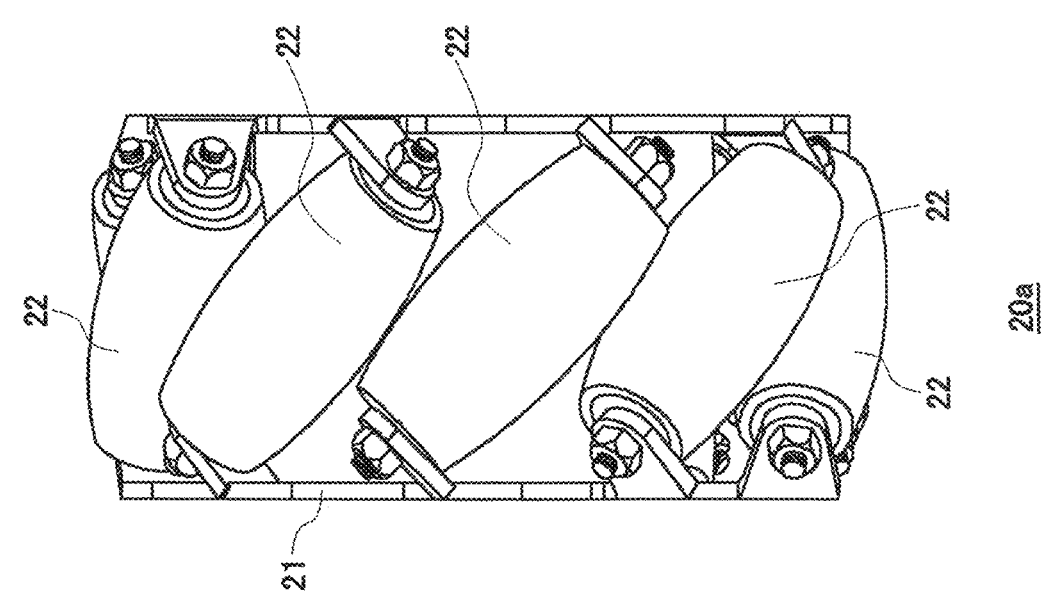

1

1

1

1

1

MOBILE BODY

CROSS-REFERENCE TO RELATED APPLICATIONS

The present application is based on PCT filing PCT/JP2022/030231, filed Aug. 8, 2022, which claims priority from Japanese Patent Application No. 2021-171192, filed Oct. 19, 2021, the entire contents of each are incorporated herein by reference.

TECHNICAL FIELD

The present disclosure relates to a mobile body that includes a plurality of wheels and that enables omnidirectional movement.

BACKGROUND ART

Omni wheels and mecanum wheels are known as wheels for realizing an omnidirectional movement mechanism that enables movement in front-and-back and left-and-right directions.

Figures 1A, 1B:
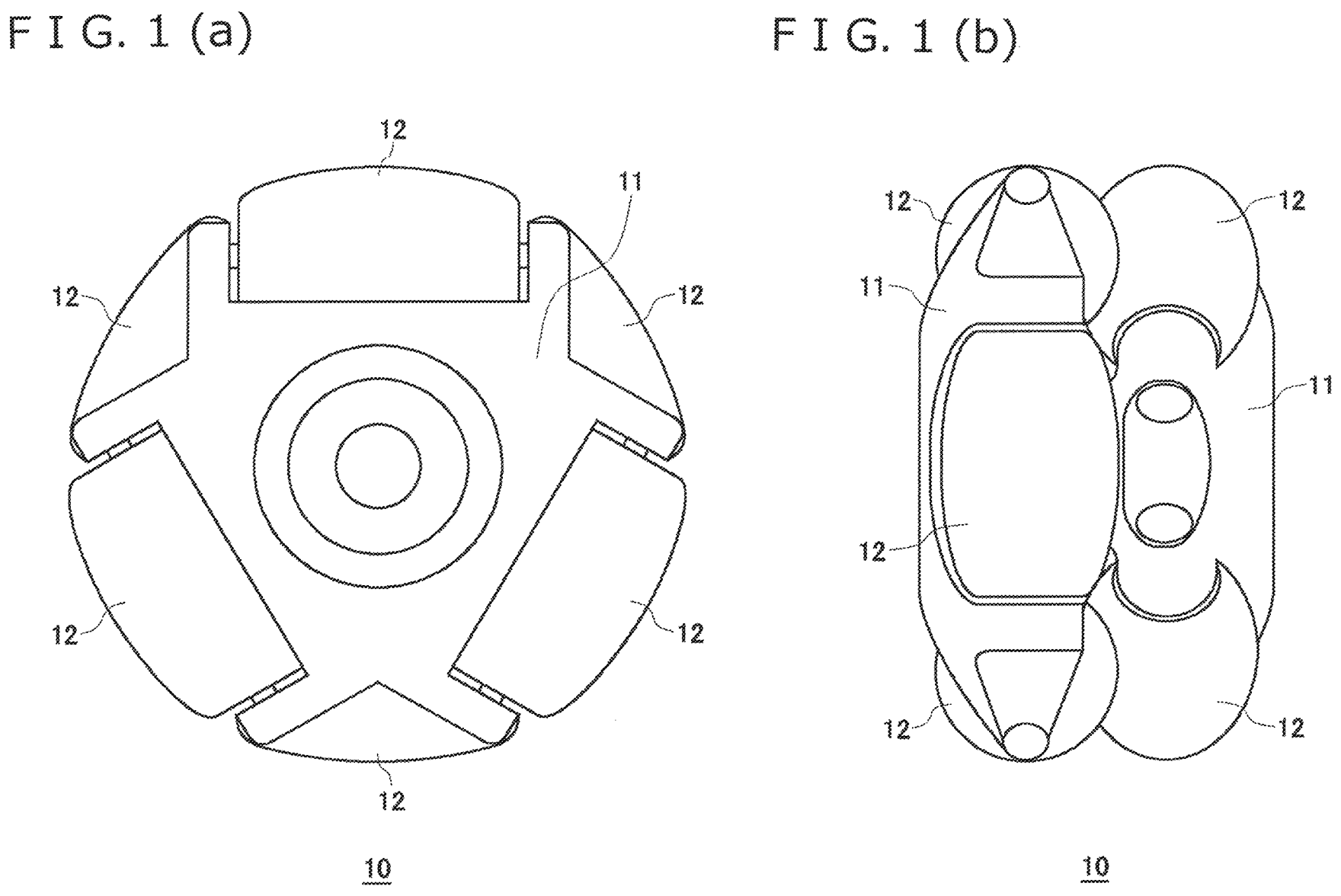

FIGS. 1(*a*) and 1(*b*) illustrate a configuration of an omni wheel 10. The omni wheel 10 includes a wheel main body 11 and a plurality of barrel-shaped rollers 12. The plurality of rollers 12 into which support shafts orthogonal to an axle are inserted are rotatably attached to an outer circumference of the wheel main body 11. The omni wheel 10 has the wheel main body 11 and the plurality of rollers 12 that are lined up in a circumferential direction and thus has freedom of movement in the axle direction without rotation of the wheel main body 11. A movement mechanism including three or more omni wheels 10 enables rotational movement and omnidirectional movement.

FIG. 2(*a*) illustrates a configuration of a left mecanum wheel 20*a*, and FIG. 2(*b*) illustrates a configuration of a right mecanum wheel 20*b*. Hereinafter, the left mecanum wheel 20*a* and the right mecanum wheel 20*b* will simply be referred to as the "mecanum wheels 20" when no distinction is made therebetween. The mecanum wheel 20 includes a wheel main body 21 and a plurality of barrel-shaped rollers 22. The mecanum wheel 20 has the wheel main body 21 and the plurality of rollers 22 that are lined up in the circumferential direction and thus has freedom of movement in a diagonal direction relative to the axle without rotation of the wheel main body 21.

As illustrated in FIG. 2(*a*), in the left mecanum wheel 20*a*, the plurality of rollers 22 into which support shafts inclined leftward and diagonally upward by 45 degrees relative to the axle are inserted are rotatably attached to the outer circumference of the wheel main body 21. Further, as illustrated in FIG. 2(*b*), in the right mecanum wheel 20*b*, the plurality of rollers 22 into which support shafts inclined rightward and diagonally upward by 45 degrees relative to the axle are inserted are rotatably attached to the outer circumference of the wheel main body 21. A movement mechanism including the two left mecanum wheels 20*a* and the two right mecanum wheels 20*b* enables rotational movement and omnidirectional movement.

SUMMARY

Technical Problem

In the omni wheel 10, the support shafts of the rollers 12 are orthogonal to the axle, which makes it necessary, in order to realize an omnidirectional mechanism using the three or more omni wheels 10, to arrange each omni wheel in such a manner that one omni wheel is oriented diagonally relative to (at an angle that is neither parallel nor a right angle with) the orientation of the other omni wheels. Rectangular box-shaped bases have so far often been used as bases of movement mechanisms. However, in the case where three omni wheels are attached to a rectangular box-shaped base, the omni wheels are arranged at positions 120 degrees apart in the circumferential direction, which creates much dead space and makes it difficult to downsize the movement mechanism.

Meanwhile, in the movement mechanism including the four mecanum wheels 20, it is possible to attach the four mecanum wheels 20 to a rectangular box-shaped base such that the wheels are oriented in the same direction, which makes it possible to reduce dead space. Meanwhile, if a four-wheel configuration is adopted, it is necessary to ensure ground contact by providing a suspension apparatus on each wheel in order to reliably transfer a driving force of each wheel to the ground, which makes the suspension apparatus provided on each wheel a hindrance to downsizing the movement mechanism.

Therefore, it is an object of the present disclosure to provide a movement mechanism configuration suitable for downsizing.

Solution to Problem

In order to solve the above problem, a mobile body according to an aspect of the present disclosure is a mobile body that enables omnidirectional movement and includes a base, three wheels attached to the base, and actuators each of which drives each wheel. Of the three wheels, one or two of the wheels are first configuration wheels, and the remaining wheel or wheels are second configuration wheels. The first configuration wheels may be mecanum wheels, and the second configuration wheels may be omni wheels.

BRIEF DESCRIPTION OF DRAWINGS

FIGS. 1(*a*) and 1(*b*) are views illustrating a configuration of an omni wheel.

FIGS. 2(*a*) and 2(*b*) are views illustrating a configuration of a mecanum wheel.

DESCRIPTION OF EMBODIMENTS

Figure 3:
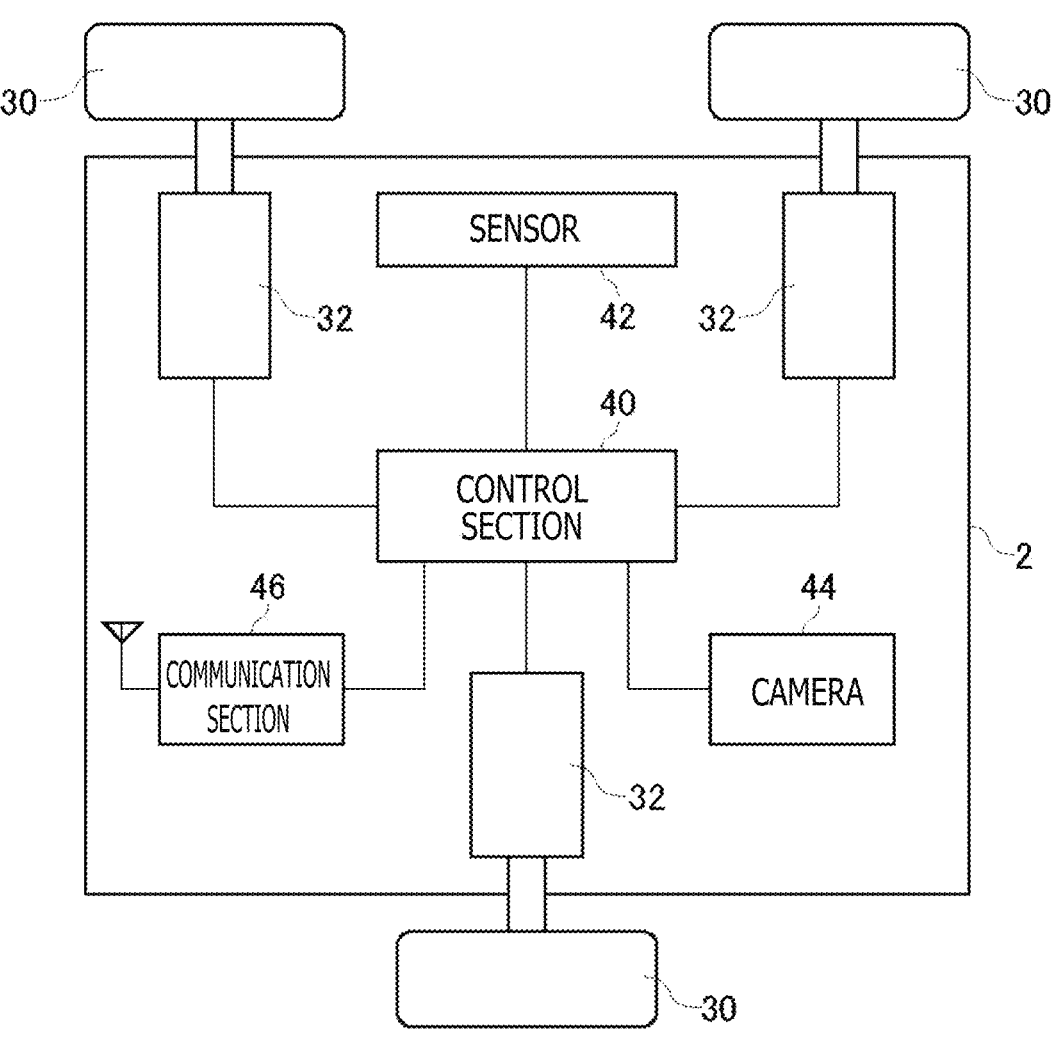
FIG. 3 is a view illustrating a configuration of a mobile body.

FIG. 3 illustrates a configuration of a mobile body 1 of a working example. The mobile body 1 includes a rectangular box-shaped base 2, and three wheels 30 are rotatably attached to the base 2. Actuators 32 that drive the respective wheels 30 are attached to the base 2, and a control section

40 independently controls three actuators 32. The control section 40 is a main processor that processes and outputs various pieces of data and instructions and controls the actuator 32 connected to each wheel 30 in such a manner as to move the mobile body 1 in a desired direction. The three wheels 30 and the actuators 32 that drive the respective wheels 30 are included in a movement mechanism of the mobile body 1. The actuators 32 may be motors.

A sensor 42 may include such a sensor as a triaxial acceleration sensor, a gyrosensor, or a positioning sensor, and supplies detected sensor data to the control section 40. A camera 44 captures images of surroundings and supplies captured images to the control section 40. A plurality of cameras 44 may be arranged in such a manner as to be able to capture images of the base 2 in all directions, thus allowing the control section 40 to obtain captured images of the entire surroundings of the base 2.

For example, the control section 40 may cause the mobile body 1 to travel autonomously by controlling the actuators 32 in reference to the sensor data supplied from the sensor 42 and the captured images supplied from the cameras 44. Also, the control section 40 may cause the mobile body 1 to travel by controlling the actuators 32 according to maneuver instructions from a user received by a communication section 46.

The movement mechanism of the mobile body 1 of the working example includes the three wheels 30 and enables omnidirectional movement, but does not have four or more wheels 30. Of the three wheels 30 attached to the base 2, one or two of the wheels 30 are first configuration wheels, and the remaining wheel or wheels 30 are second configuration wheels that are different in type from the first configuration wheels. It should be noted that, in the working example, the first configuration wheels may be the mecanum wheels 20 and that the second configuration wheels may be the omni wheels 10.

The omni wheel 10 may be a wheel that includes the wheel main body 11 and the plurality of rollers 12 into which support shafts orthogonal to the axle are inserted and that are rotatably attached to the outer circumference of the wheel main body 11. Also, the mecanum wheel 20 may be a wheel that includes the wheel main body 21 and the plurality of rollers 22 into which support shafts inclined diagonally relative to the axle are inserted and that are rotatably attached to the outer circumference of the wheel main body 21. It should be noted that inclination angles of the plurality of support shafts may not all be equal. The mobile body 1 can ensure stable ground contact by having a three-wheel configuration, which makes suspension apparatuses unnecessary.

In the mobile body 1, each wheel 30 is attached in such a manner as to be parallel with an attachment surface of the rectangular box-shaped base 2, and thus, the one wheel 30 is oriented parallel or orthogonal to the orientation of the other wheels 30. Attaching the three wheels 30 parallel with the attachment surfaces of the base 2 makes it possible to arrange the actuators 32 inside the base 2 with higher space efficiency than in the case where they are attached diagonally relative to the attachment surfaces, which enables effective use of the base space.

Hereinafter, configuration examples of the three wheels 30 will be described. It should be noted that the following FIGS. 4 to 9 illustrate the positions of the wheels 30 and the actuators 32 relative to the base 2 and that the control section 40, the sensor 42, the cameras 44, and the communication section 46 are not illustrated.

Figure 4:
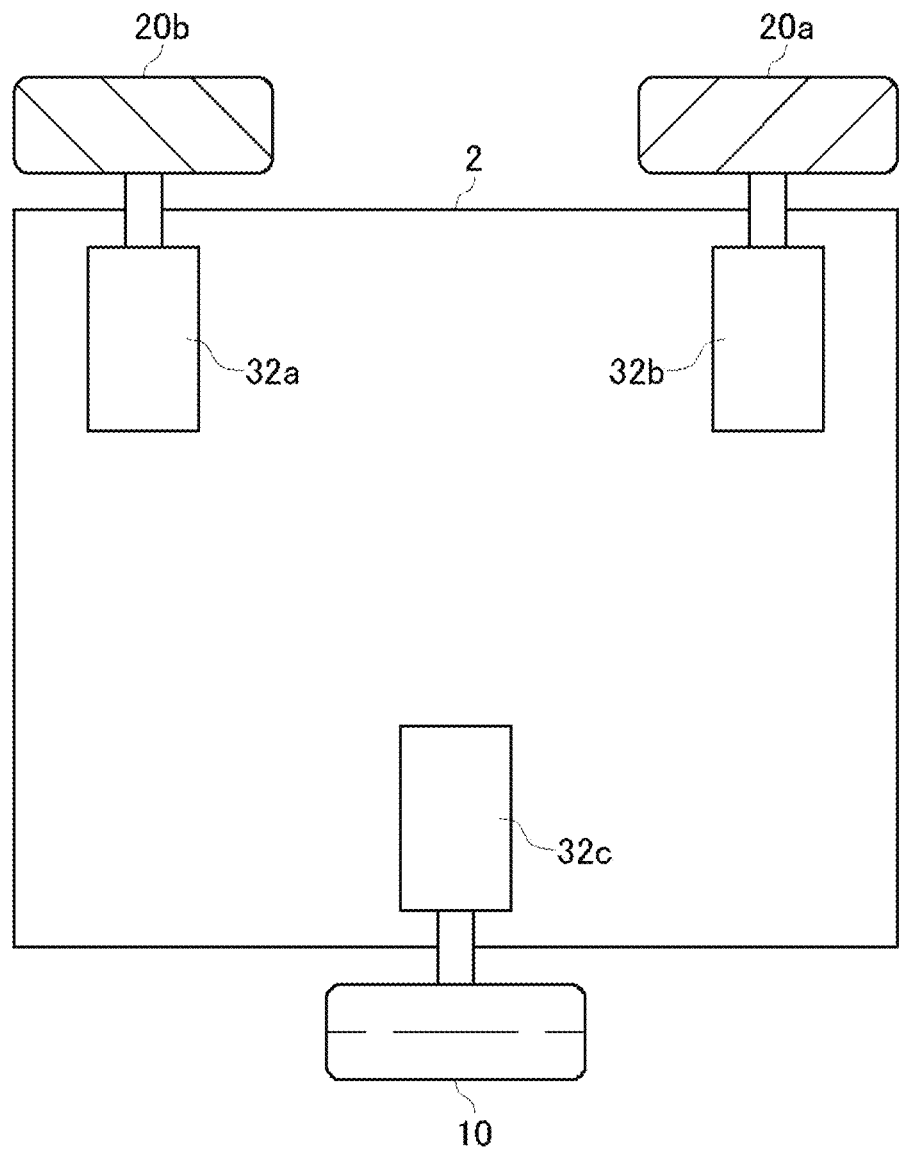
FIG. 4 is a view illustrating an example of a wheel configuration of the mobile body.

FIG. 4 illustrates an example of the wheel configuration of the mobile body. The mobile body 1 includes the pair of right mecanum wheel 20b and left mecanum wheel 20a on a front surface of the base 2 and the omni wheel 10 on a back surface of the base 2. The right mecanum wheel 20b, the left mecanum wheel 20a, and the omni wheel 10 are connected respectively to an actuator 32a, an actuator 32b, and an actuator 32c. The pair of right mecanum wheel 20b and left mecanum wheel 20a are arranged in such a manner as to be oriented in the same direction. Wheel diameters of the right mecanum wheel 20b, the left mecanum wheel 20a, and the omni wheel 10 may be the same. In the wheel configuration example illustrated in FIG. 4, it is possible to align the orientations of the actuators 32a, 32b, and 32c, which enables effective use of the space of the base 2. It should be noted that the mobile body 1 may include the pair of right mecanum wheel 20b and left mecanum wheel 20a on the back surface of the base 2 and the omni wheel 10 on the front surface of the base 2.

Figure 5:
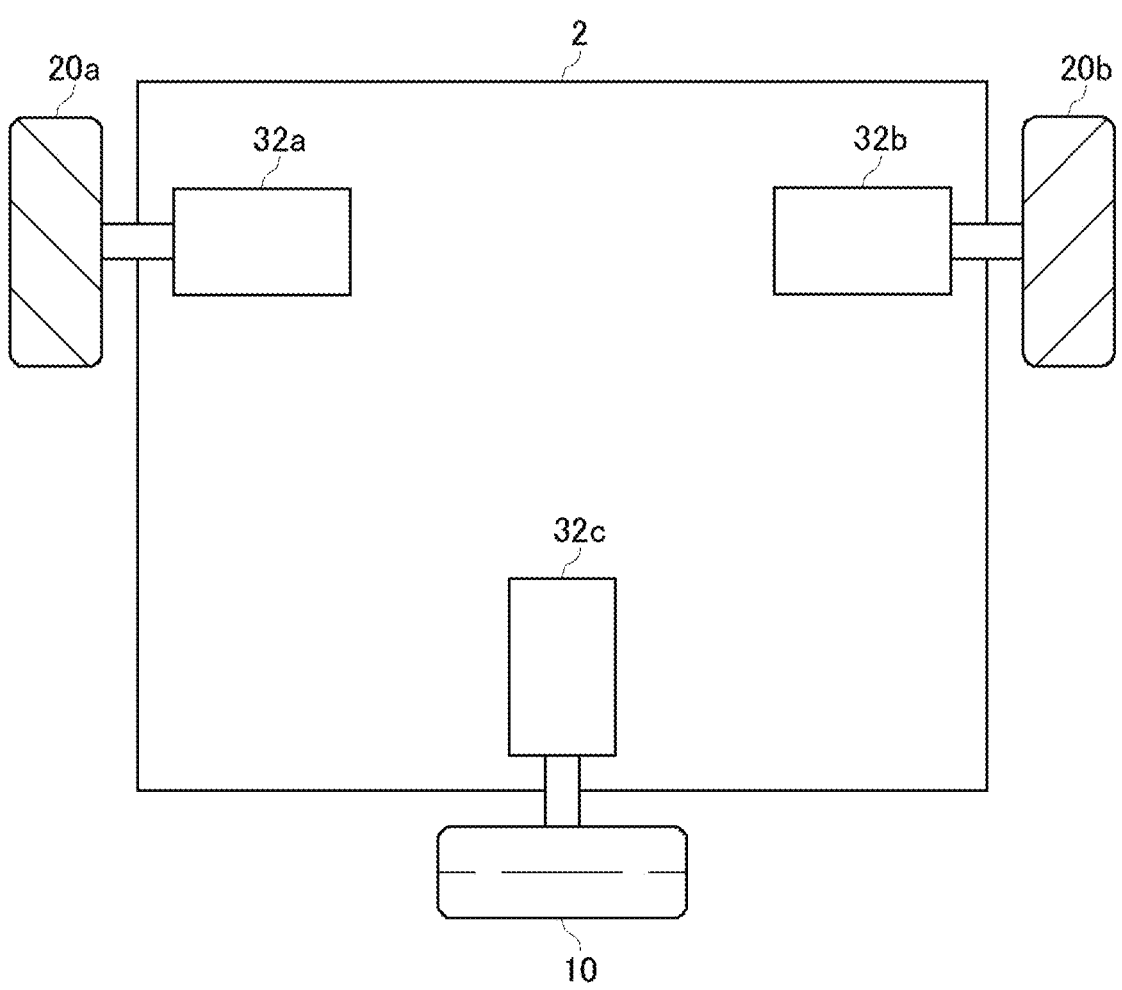
FIG. 5 is a view illustrating another example of a wheel configuration of the mobile body.

FIG. 5 illustrates another example of a wheel configuration of the mobile body. The mobile body 1 includes the left mecanum wheel 20a on a left side surface of the base 2, the right mecanum wheel 20b on a right side surface of the base 2, and the omni wheel 10 on the back surface of the base 2. The left mecanum wheel 20a, the right mecanum wheel 20b, and the omni wheel 10 are connected respectively to the actuator 32a, the actuator 32b, and the actuator 32c. The left mecanum wheel 20a and the right mecanum wheel 20b are arranged in such a manner as to be oriented in the same direction. The wheel diameters of the left mecanum wheel 20a, the right mecanum wheel 20b, and the omni wheel 10 may be the same. In the wheel configuration example illustrated in FIG. 5, the pair of left mecanum wheel 20a and right mecanum wheel 20b are attached to the two side surfaces of the base 2, which makes it possible for the user to intuitively recognize forward and backward directions of the mobile body 1. It should be noted that the positions of the left mecanum wheel 20a and the right mecanum wheel 20b may be interchanged.

Figure 6:
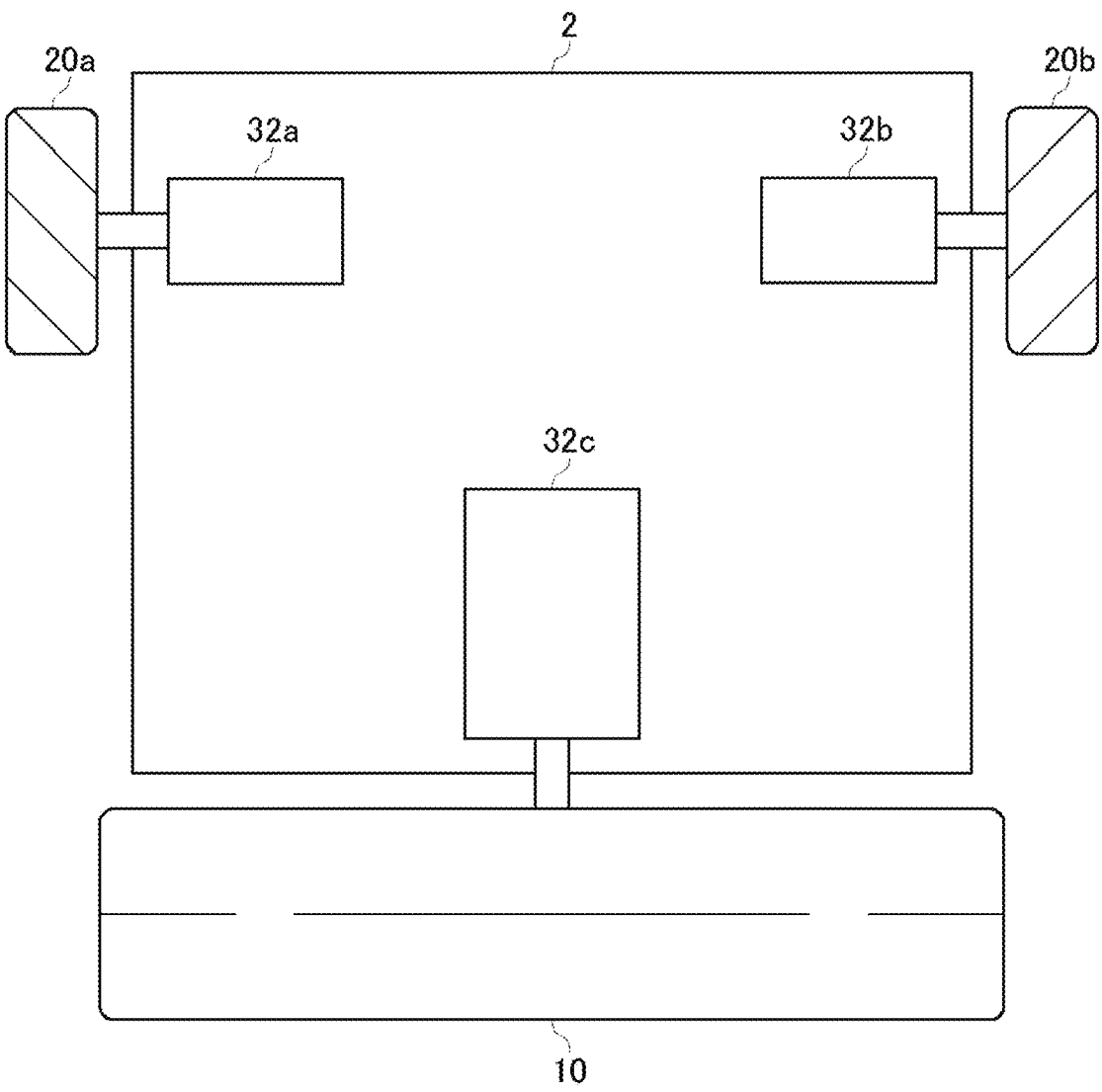
FIG. 6 is a view illustrating another example of a wheel configuration of the mobile body.

FIG. 6 illustrates another example of a wheel configuration of the mobile body. The mobile body 1 includes the left mecanum wheel 20a on the left side surface of the base 2, the right mecanum wheel 20b on the right side surface of the base 2, and the omni wheel 10 on the back surface of the base 2. The wheel arrangement illustrated in FIG. 6 may be the same as the wheel arrangement illustrated in FIG. 5.

In the wheel configuration illustrated in FIG. 6, while the wheel diameters of the left mecanum wheel 20a and the right mecanum wheel 20b are the same, the wheel diameter of the left mecanum wheel 20a and the right mecanum wheel 20b is different from the wheel diameter of the omni wheel 10. As illustrated, the wheel diameter of the omni wheel 10 is larger than the wheel diameter of the mecanum wheels 20. According to the wheel configuration illustrated in FIG. 6, a level difference that can be overcome during movement in the front-and-back direction depends on the diameter of the rollers 12 in the omni wheel 10. Thus, as illustrated in FIG. 6, it is possible to improve gap running performance of the mobile body 1 in the front-and-back direction by increasing the wheel diameter of the omni wheel 10 and upsizing the diameter of the rollers 12.

Figure 7:
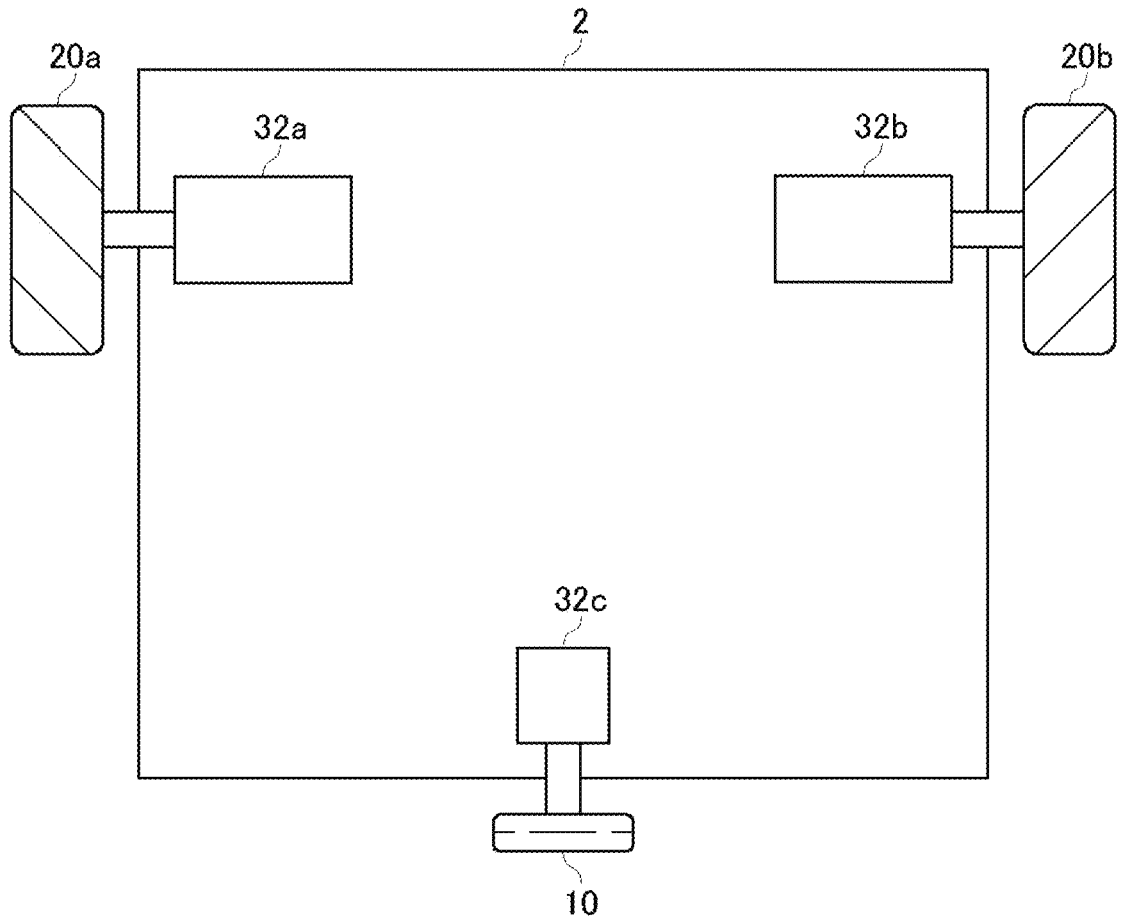
FIG. 7 is a view illustrating another example of a wheel configuration of the mobile body.

FIG. 7 is a view illustrating another example of a wheel configuration of the mobile body. The mobile body 1 includes the left mecanum wheel 20a on the left side surface of the base 2, the right mecanum wheel 20b on the right side surface of the base 2, and the omni wheel 10 on the back surface of the base 2. The wheel arrangement illustrated in FIG. 7 may be the same as the wheel arrangement illustrated in FIG. 5.

In the wheel configuration illustrated in FIG. 7, while the wheel diameters of the left mecanum wheel 20*a* and the right mecanum wheel 20*b* are the same, the wheel diameter of the left mecanum wheel 20*a* and the right mecanum wheel 20*b* is different from the wheel diameter of the omni wheel 10. As illustrated, the wheel diameter of the omni wheel 10 is smaller than the wheel diameter of the mecanum wheels 20. According to the wheel configuration illustrated in FIG. 7, although motion characteristics in the left-and-right direction deteriorate due to the small wheel diameter of the omni wheel 10, it is possible to downsize the actuator 32*c*, which contributes to downsizing the mobile body 1 as a whole.

Figure 8:
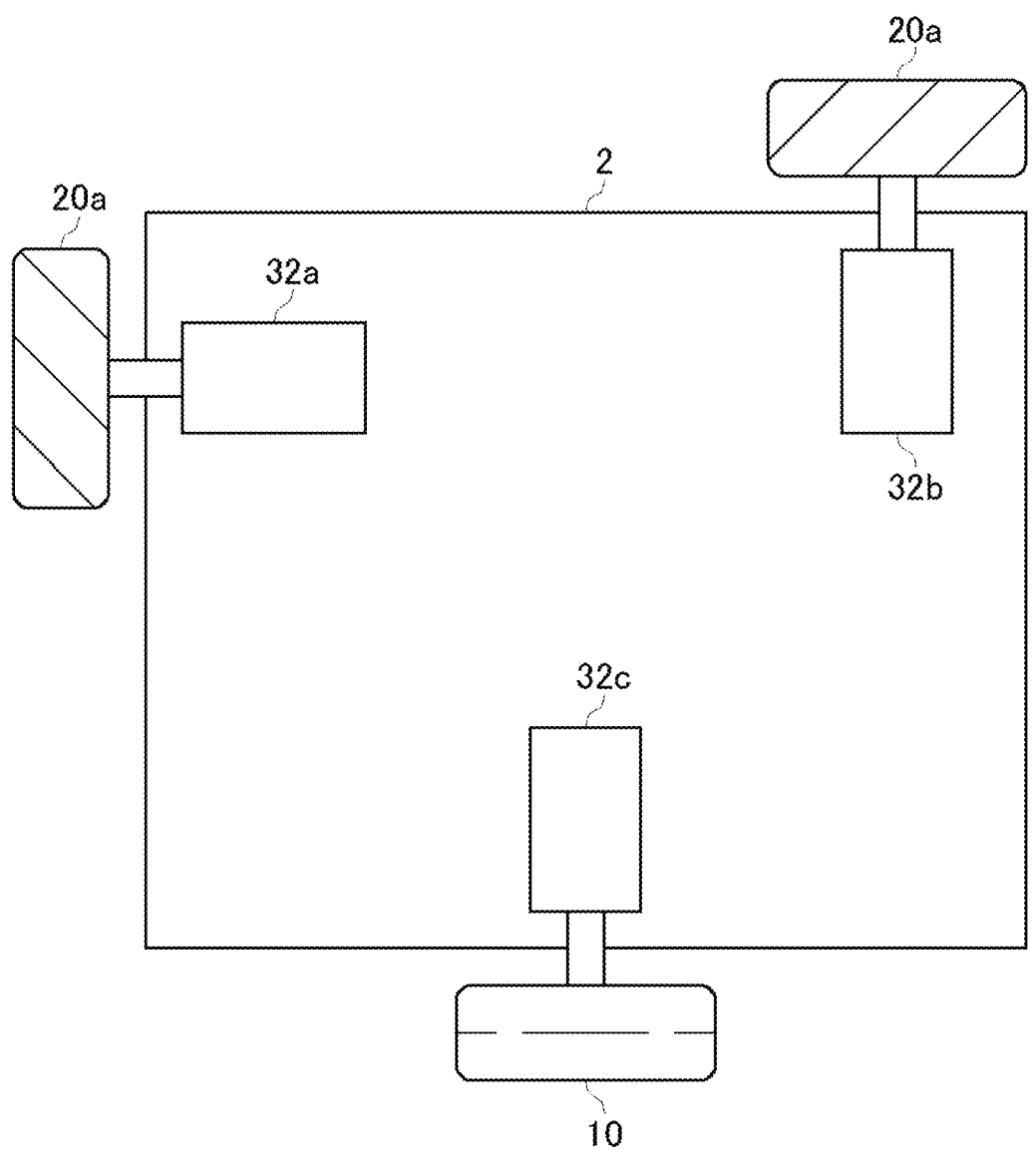
FIG. 8 is a view illustrating another example of a wheel configuration of the mobile body.

FIG. 8 is a view illustrating another example of a wheel configuration of the mobile body. The mobile body 1 includes the left mecanum wheel 20*a* on the left side surface of the base 2, the left mecanum wheel 20*a* on the front surface of the base 2, and the omni wheel 10 on the back surface of the base 2. The left mecanum wheel 20*a* on the left side surface, the left mecanum wheel 20*a* on the front surface, and the omni wheel 10 are connected respectively to the actuator 32*a*, the actuator 32*b*, and the actuator 32*c*. The two left mecanum wheels 20*a* are arranged in such a manner as to be oriented in the orthogonal directions. It should be noted that the two right mecanum wheels 20*b* may be used in place of the two left mecanum wheels 20*a*.

Figure 9:
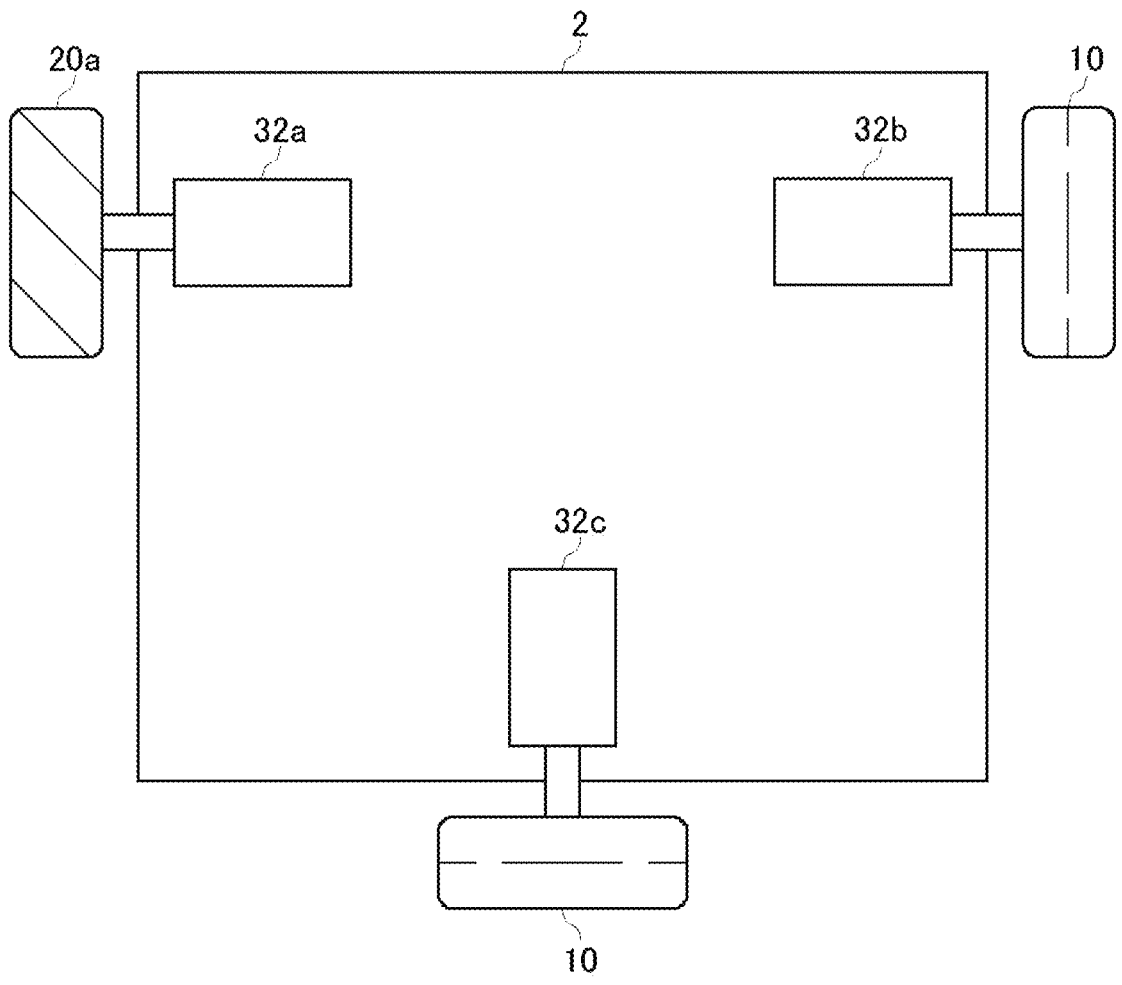
FIG. 9 is a view illustrating another example of a wheel configuration of the mobile body.

FIG. 9 is a view illustrating another example of a wheel configuration of the mobile body. The mobile body 1 includes the left mecanum wheel 20*a* on the left side surface of the base 2, the omni wheel 10 on the right side surface of the base 2, and the omni wheel 10 on the back surface of the base 2. The left mecanum wheel 20*a*, the omni wheel 10 on the right side surface, and the omni wheel 10 on the back surface are connected respectively to the actuator 32*a*, the actuator 32*b*, and the actuator 32*c*.

While two of the three wheels 30 are the mecanum wheels 20 and one was the omni wheel 10 in the wheel configuration examples illustrated in FIGS. 4 to 8, one wheel is the mecanum wheel 20 and two wheels are the omni wheels 10 in the wheel configuration example illustrated in FIG. 9. As illustrated in FIG. 9, even if one of the three wheels 30 is the mecanum wheel 20 and the two wheels 30 are the omni wheels 10, it is possible to realize omnidirectional movement.

The present disclosure has been described above in reference to the working example. It is to be understood by those skilled in the art that the above working example is illustrative, that various modification examples are possible regarding combinations of the respective components and processes thereof, and that such modification examples also fall within the scope of the present disclosure.

INDUSTRIAL APPLICABILITY

The present disclosure is applicable to mobile bodies that have a plurality of wheels and that enable omnidirectional movement.

REFERENCE SIGNS LIST

1: Mobile body
2: Base
10: Omni wheel
11: Wheel main body
12: Roller
20: Mecanum wheel
20*a*: Left mecanum wheel
20*b*: Right mecanum wheel
21: Wheel main body
22: Roller
30: Wheel
32, 32*a*, 32*b*, 32*c*: Actuator
40: Control section
42: Sensor
44: Camera
46: Communication section

The invention claimed is:

1. A mobile body that enables omnidirectional movement comprising:

a base;

three wheels attached to the base, wherein two of the wheels are first configuration wheels, and the remaining wheel is a second configuration wheel, the second configuration being different from the first configuration, wherein the first configuration wheels each comprise a wheel main body and a plurality of rollers into which support shafts orthogonal to an axle are inserted and that are rotatably attached to an outer circumference of the wheel main body, and the second configuration wheel comprises a wheel main body and a plurality of rollers into which support shafts diagonally inclined relative to the axle are inserted and that are rotatably attached to an outer circumference of the wheel main body;

three actuators that each comprise a respective motor and are configured to drive a respective one of the three wheels; and a control section comprising a processor, the control section being configured to independently control the three actuators, wherein the motors and the control section are arranged within the base.

2. The mobile body according to claim 1, wherein the second configuration wheel is oriented parallel or orthogonal to an orientation of the first configuration wheels.

3. The mobile body according to claim 1, wherein a wheel diameter of the first configuration wheels is different from a wheel diameter of the second configuration wheel.

4. The mobile body according to claim 1, wherein each of the three wheels is attached to an outer surface of the base, and an axle of each wheel extends orthogonally to the respective outer surface of the base.

5. A mobile body that enables omnidirectional movement comprising:

a base;

three wheels attached to the base, wherein two of the wheels are first configuration wheels, and the remaining wheel is a second configuration wheel, the second configuration being different from the first configuration, wherein the first configuration wheels are omni wheels, and the second configuration wheel is a mecanum wheel;

three actuators that each comprise a respective motor and are configured to drive a respective one of the three wheels; and a control section comprising a processor, the control section being configured to independently control the three actuators, wherein the motors and the control section are arranged within the base.

6. The mobile body according to claim 5, wherein
the second configuration wheel is oriented parallel or
orthogonal to an orientation of the first configuration
wheels.

7. The mobile body according to claim 5, wherein
a wheel diameter of the first configuration wheels is
different from a wheel diameter of the second configu-
ration wheel.

8. The mobile body according to claim 5, wherein
each of the three wheels is attached to an outer surface of
the base, and an axle of each wheel extends orthogo-
nally to the respective outer surface of the base.

\* \* \* \* \*